United States Patent [19]

Morin et al.

[11] Patent Number: 5,099,700

[45] Date of Patent: Mar. 31, 1992

[54] EXTENSOMETRIC SENSOR FOR MEASURING THE STRESSES ACTING ON A DRILLING ELEMENT AND A DEVICE FOR MOUNTING SUCH A SENSOR

[75] Inventors: Pierre Morin, Levallois Perret; Claude Mabile, Vanves, both of France

[73] Assignee: Institut Francais du Petrole, Rueil Malmaison, France

[21] Appl. No.: 459,280

[22] Filed: Dec. 29, 1989

[30] Foreign Application Priority Data

Dec. 29, 1988 [FR] France ............... 88 17556

[51] Int. Cl.$^5$ .................... G01L 5/16; G01B 7/18; E21B 47/00
[52] U.S. Cl. .................... 73/862.04; 73/151; 338/6; 33/790
[58] Field of Search ............ 73/862.04, 862.06, 151, 73/147, 767; 338/6; 33/787, 790, DIG. 13

[56] References Cited

U.S. PATENT DOCUMENTS

| | | | |
|---|---|---|---|
| 2,070,320 | 2/1937 | Shields | 73/151 X |
| 3,613,443 | 10/1971 | Curry | 73/147 |
| 3,686,942 | 8/1972 | Chatard et al. | 73/151 |
| 3,855,857 | 12/1974 | Claycomb | 73/151 |
| 3,995,476 | 12/1976 | Hoffman | 73/767 |
| 4,160,325 | 7/1979 | DeNicola | 33/DIG. 13 |

FOREIGN PATENT DOCUMENTS 216327 11/1968 U.S.S.R. ..................... 73/147

Primary Examiner—Charles A. Ruehl
Attorney, Agent, or Firm—Antonelli, Terry, Stout & Kraus

[57] ABSTRACT

An extensometric sensor for measuring stresses acting on a drilling element at a bottom of a well, with the sensor including a first measurement zone formed from at least two traction blades, on which are mounted measurement gauges, connected at their ends by uprights so as to form a first deformable parallelogram, with the traction blades being oriented in a first direction. A second measurement zone is formed of at least two torsion blades, on which are mounted measurement gauges, connected by cross pieces so as to form a second deformable parallelogram, with the torsion blades being oriented in a second direction perpendicular to the first direction. The first and second zones are connected and the same is mounted on a drilling element, with the cross pieces and uprights having large dimensions with respect to the torsion blades and the traction blades.

17 Claims, 2 Drawing Sheets

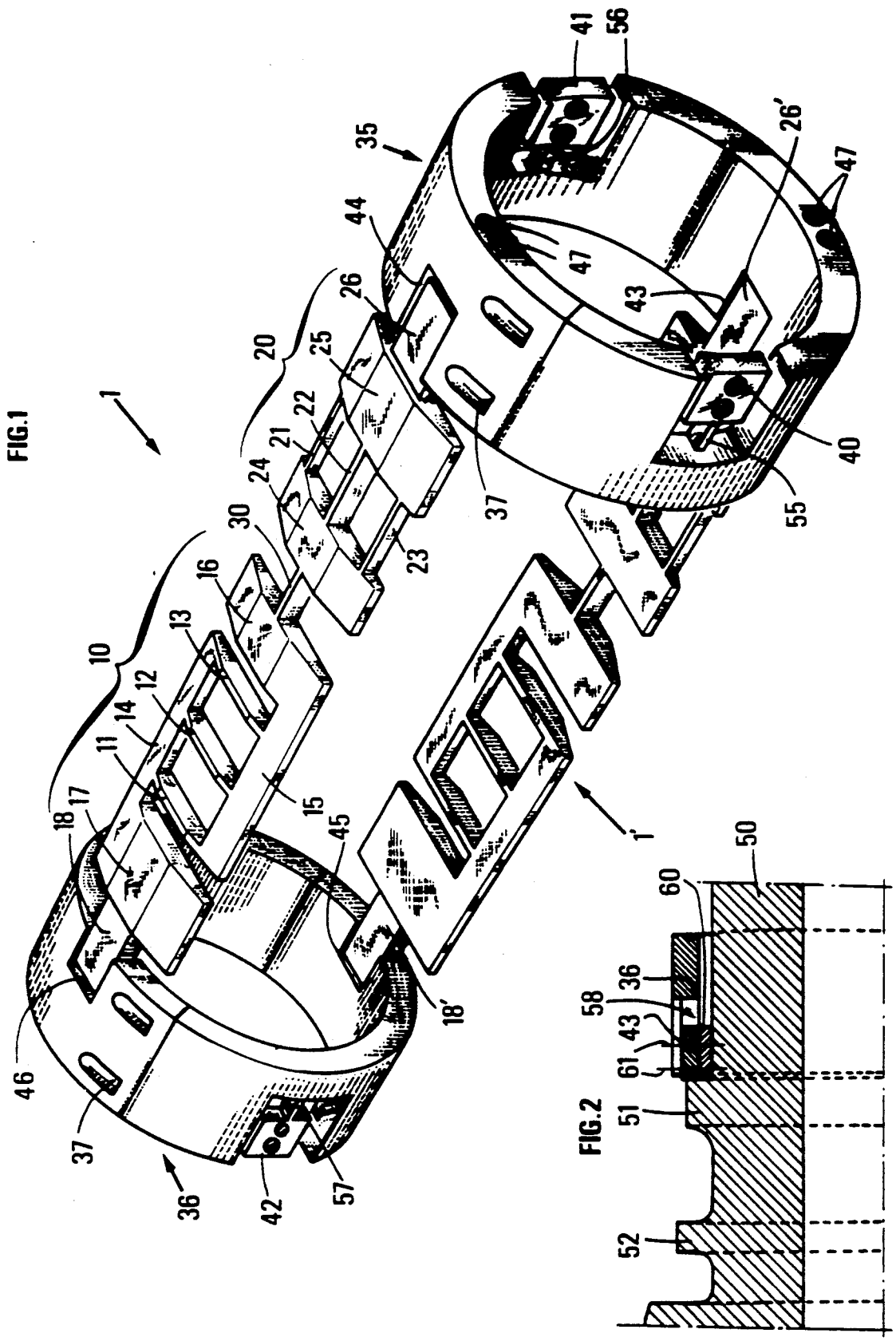

EXTENSOMETRIC SENSOR FOR MEASURING THE STRESSES ACTING ON A DRILLING ELEMENT AND A DEVICE FOR MOUNTING SUCH A SENSOR

BACKGROUND OF THE INVENTION

The present invention relates to extensometric sensors for measuring stresses acting on a drilling element at the bottom of a well, as well as a device for mounting it on the element, for measuring the tension and the twisting moment applied under bottomhole drilling conditions.

The forces exerted on the drilling equipment at the bottom of a well when progressing into the formation are considerable and involve considerably deformations which may possible damage the measuring apparatus situated close to the end where a tool or probe is situated. It is then necessary to analyze the stresses which are exerted on the equipment so as to derive therefrom the modifications to be made to the drilling conditions.

If the stresses exerted on a tube subjected to the bottomhole drilling conditions are studied, it can be seen that they are essentially of three kinds: flexion with respect to the axis of the drilling element, tension/traction along this axis and a twisting moment. Among these stresses, those due to flexion are appreciably greater than those due to the tension or to the twisting moment.

One of the existing methods of evaluating stresses applied in the drilling field consists in bonding stress gauges at appropriate positions along the drilling element and processing the collected signals so as to evaluate the flexion, traction and twisting stresses by decoupling. It can then be discovered that the flexion stresses are exerted in a direction perpendicular to the twisting stresses.

In order to overcome the flexion stresses, if stress gauges are placed diametrically symmetrically with respect to the axis of the tube, the sum of the measurements of these flexion stresses is canceled out. On the other hand, the sum of the traction stresses measured under the same conditions doubles the sensitivity of the measurement.

Thus, theoretically, by appropriately bonding the extension gauges, complexes decoupling is obtained between the flexion, tension/traction and twisting measurements.

However, the imperfections of the metal and the slight bonding errors lead to the observation of so-called transverse sensitivity effects.

Thus, if the element is subjected to pure flexion, a more or less considerable effect will be observed on the measurement of the tension or of the twisting.

This transverse sensitivity is all the greater the lower the lever of the effect it is desired to measure with respect to that of the disturbing signal. This is the case for a tube subjected to bottomhole drilling conditions.

SUMMARY OF THE INVENTION

The object of the present invention is then to overcome the above drawbacks and in particular to suppress the transverse sensitivity effects by using an extensometric sensor mounted on the tube and subjected to bottomhole drilling conditions, with this sensor being constructed so as to provide simple and reliable positioning of the gauges for complete decoupling between the flexion, tension and twisting measurements.

The main idea of the present invention is to construct the extensometric sensor in the form of two deformable parallelograms placed perpendicularly to each other, each receiving on two opposite sides, which have small dimensions with respect to the total length of the sensor, the extension gauges which, through the respective position of the two parallelograms with respect to each other and the longitudinal fixing of the sensor on the tube, make decoupling of the tension and twisting measurements possible.

The present invention provides an extensometric sensor for measuring, through gauges, stresses acting on a drilling element at the bottom of a well, with the sensor comprising a first measurement zone formed from at least two traction blades, on which are mounted measurement gauges, connected at their ends by uprights so as to form a first deformable parallelogram, with the traction blades being oriented in a first direction. A second measurement zone is formed of at least two torsion blades, on which are mounted measurement gauges, connected at their ends by cross pieces so as to form a second deformable parallelogram, with the torsion blades being oriented in a second direction perpendicular to the first direction. The first and second zones are connected by cooperating means and comprise means for mounting on the drilling element, with the cross pieces and the uprights having large dimensions with respect to both the torsion and traction blades.

According to a particular feature of the invention, the cooperation means between the first zone and the second zone comprise an articulation disposed centrally with respect to a longitudinal axis passing through the first and second zones, the articulation providing for flexion of the sensor along the longitudinal axis without any action of deformation on the first and second zones.

Advantageously, the uprights of the first zone each comprise at one end thereof a right/angled extension, with an extension of a first upright being connected to the flexion articulation and an extension of a second upright being provided with a lug for fixing to said drilling element.

According to another feature of the invention, a first cross-piece of the second zone is connected to the flexion articulation and a second cross-piece is provided with a lug for fixing to said drilling element.

The extensions of the uprights and of the cross-pieces are advantageously situated in parallel directions, perpendicular to the direction of the flexion articulation.

In a preferred embodiment of the invention, each of the first and second measurement zones comprises three blades, two of which form the opposite faces of the deformable parallelogram and the third of which, which is between the first two, supports the stress measurement gauges.

Advantageously, the ratio between the length of the blades and the total length of the sensor is between 1/10 and 2/10 and the ratio between the thickness of said blades and the thickness of the uprights or of the cross-pieces is between 1/20 and 1/10.

The present invention also relates to a device for mounting at least one extensometric stress measurement sensor, such as described above, on a drilling element at the bottom of a well, wherein the sensor is mounted on the element by support means so that the axis of the sensor is substantially in the longitudinal direction of the drilling element.

In a particular embodiment of this mounting device, the support means are formed by two rings disposed about the drilling element and supporting, on the one hand, each one an end of a sensor through a fixing lug and, on the other hand, a piece disposed symmetrically to the sensor with respect to the axis of the drilling element.

Advantageously, the piece place symmetrically to the sensor is formed by a second extensometric sensor.

Each of the support rings comprises two projections which are diametrically opposite with respect to the axis of the drilling element, and are situated in a direction perpendicular to the direction of the means for fixing the extensometric sensors on the rings, the projections forming points for mounting the rings on the drilling element by securing means.

In a preferred embodiment, the projections each comprise a flexible blade forming an articulation for the rings with respect to the drilling element when the element is subjected to a flexion force in a plane containing said projections.

Advantageously, the support rings comprise recesses in which a lug is engaged for fixing the extensometers, the fixing lugs being held in position in the recesses by locking screws.

The support rings further comprise lateral recesses, situated symmetrically with respect to a recess receiving a fixing lug, in which are engaged wedges which are movable by pusher screws so as to prestress the extensometers.

Advantageously, damping shoes are placed between the extensometers and the drilling element for dampling the vibrations.

The invention finally relates to a method for measuring the tension and twisting moment applied to a drilling element by an extensometric sensor mounting device such as described above, wherein stress gauges are placed on the first and second sensors at the level of the middle blades of each deformable parallelogram, measurements are made when deformations are generated, the stresses applied are calculated by, on the one hand, summing the electric signals for the gauges situated on the first measurement zone so as to obtain the value of the tension and, on the other hand, summing the signals for the gauges situated on the second measurement zone so as to obtain the twisting moment.

BRIEF DESCRIPTION OF THE DRAWINGS

A particular embodiment of the invention will now be described so as to give a better understanding of the essential characteristics and advantages thereof, it being however understood that this embodiment is chosen by way of example and is in limitative, the description referring to the accompanying drawings in which:

FIG. 1 is a perspective view of two extensometric stress measurement sensors connected to a mounting device in the form of support rings, FIG. 2 is part cross-sectional view of the fitting of a support ring to the drilling element.

DESCRIPTION OF THE PREFERRED EMBODIMENTS

Figure 3:
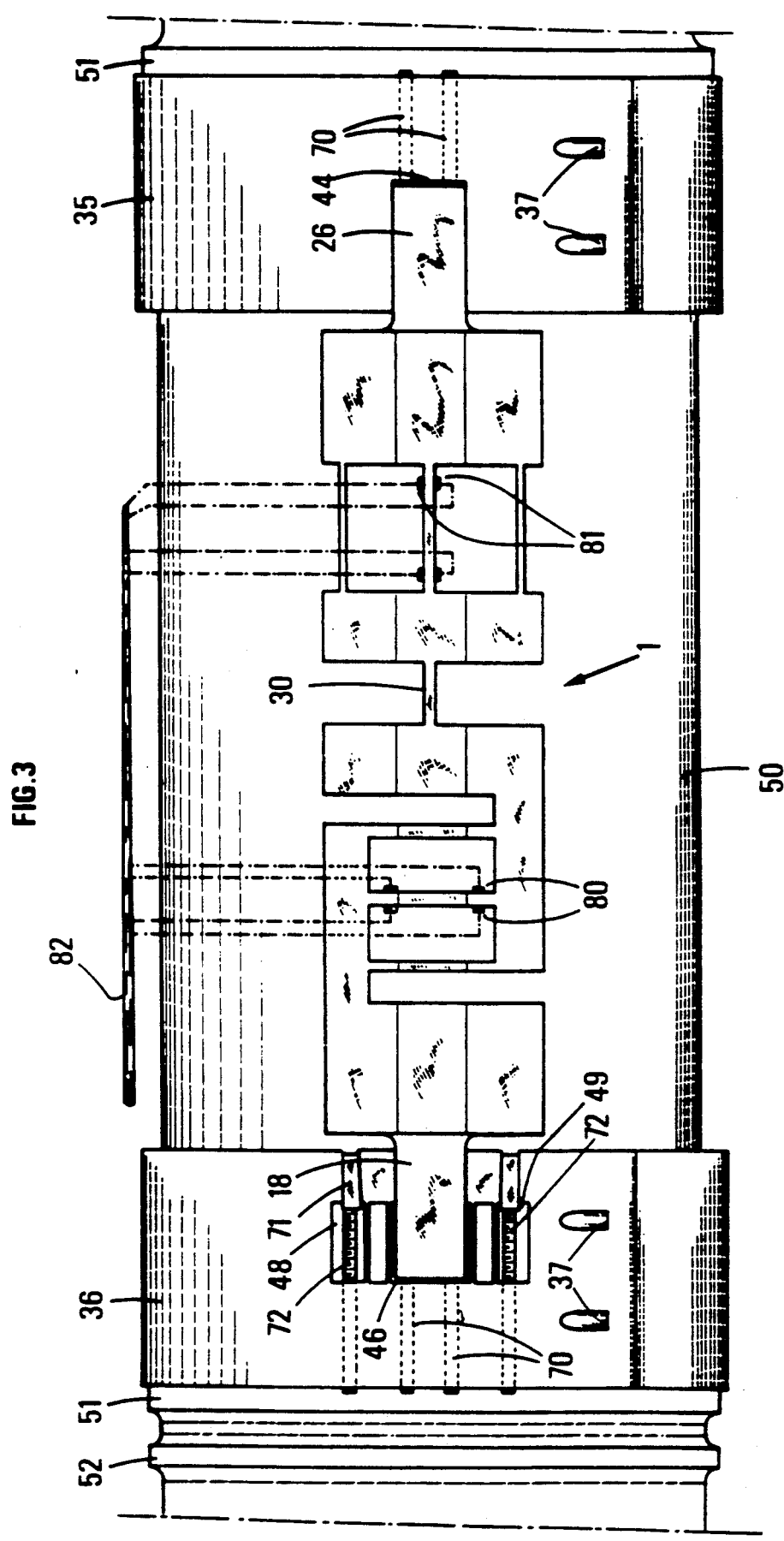
FIG. 3 is a general view of an extensometric sensor mounted on a drilling element by two support rings, as well as the electrical connections connected to such a device.

FIG. 1 shows a mounting assembly for stress gauges to be disposed on a drilling element at the bottom of a well such as a drill string element or casing in particular.

This assembly comprises two extensometric sensor 1, 1' for measuring the stresses by means of gauges.

In FIG. 1 the two extensometric sensors 1,1' can be seen mounted at each of their ends on two support rings 35, 36 surrounding the tubular element.

The construction of an extensometric sensor will be described first of all before examining the method of positioning same with respect to the drilling element.

This extensometric sensor comprises a first measurement zone 10 for measuring the traction applied to the element subjected to stresses. This first measurement zone comprises three traction blades 11, 12, 13 on which the measurement gauges are secured. These three blades being connected at their ends by uprights 14, 15. The assembly formed by the three traction blades 11, 12, 13 and the two uprights forms a deformable parallelogram which is deformable in the direction of the uprights for the latter have a thickness which is largely dimensioned with respect to that of the traction blades. In FIG. 1, the first measurement zone comprises three traction blades. Two blades are placed at each end of the deformable parallelogram, the third being on the mid-perpendicular. On each face of the this third middle blade four gauges 80 are placed symmetrically in pairs. However, the advantages of the present invention would still be obtained if this first zone only has two blades, the gauges then being disposed on each of them.

The extensometric sensor comprises a second measurement zone 20 with three torsion blades 21, 22, 23 connected at their ends by cross-pieces 24, 25 which are largely dimensioned with respect to said torsion blades 20, 22, 23 so as to form a second deformable parallelogram which is deformable in the direction of the cross-pieces.

As for the first measurement zone, the second parallelogram comprises two blades 21, 23 at the ends of the parallelogram and a central median blade 22 on which the stress gauges 81 are disposed. However, it is possible to use only two of these torsion blades.

The gauges placed on the median blade of the first zone and those placed on the median blade of the second zone are connected to electric connections 82 (FIG. 3) which transmit the signals received to control electronics where they are analyzed and then sent to the surface.

The first measurement zone 10 and the second measurement zone 20 are connected together by cooperation means, such as an articulation 30 disposed centrally with respect to a longitudinal axis passing through the first and second zones. This articulation 30 connected the two zones together so that the tension blades 11, 12, 13 are oriented in a direction perpendicular to the direction of the torsion blades 21, 22, 23. In addition, this central articulation 30 provides for flexion of the sensor along the longitudinal axis of the sensor without any action of deformation on the first and second measurement zones.

The first measurement zone further comprises, on a respective end of each upright, an extension 16, 17, placed at right-angles so as to provide positioning for this first zone. Extension 16, placed perpendicularly to upright 15, supports the central articulation 30 which connects to cross-pieces 24. On the opposite face of the parallelogram, the extension 17, placed perpendicularly to upright 14, supports a fixing lug 18 adapted so as to permit cooperation with the drilling element. A second fixing lug 26 is disposed identically symmetrically on the cross-piece 25.

The longitudinal axis of the extensometric sensor coincides with the directions of the fixing lugs 18, 26 and of the central flexion articulation 30.

Cross-pieces 24, 25 and extensions 16, 17 are situated in parallel directions.

It will be readily understood that extensions 16, 17 are joined only to a single upright so as to permit deformation of the traction parallelogram while maintaining the two extensions 16, 17 in directions parallel to the two cross-pieces 24, 25.

Preferably and by way of example, the length of blades 11, 12, 13, 21, 22, 23 and the total length of sensor 1 are in a ratio of 1/10 to 2/10. The ratio of the thickness of the blades to the thickness of the uprights of the cross-pieces is between 1/20 and 1/10. With such dimensioning, the extensometric sensor can manifestly transform the stresses which is undergoes into deformations of the two parallelograms oriented in two perpendicular directions.

After describing the geometrical construction of the extensometric sensor, it is possible to examine its positioning with respect to the object subjected to the stresses. The framework of the invention may be imagined in the case of a simple longitudinal bar. In this application, it would be necessary to place the extensometric sensor along its central axis in the longitudinal direction of the bar. The fixing lugs 18, 26 cooperate with the bar so as to provide positioning thereof in the longitudinal direction.

An extensometric sensor may also be placed inside a tube so as to cause the axis of the tube to coincide with the longitudinal axis of the sensor. Mounting means are adapted for supporting the fixing lugs and providing axial positioning.

However, the present invention applies preferably (as shown In FIGS. 1 and 3) to positioning of the extensometric sensor on the external surface of a drilling tube.

For fixing, two rings 35, 36 are used each of which is formed of two half rings which surround the drilling element 50. Each of the half rings is fixed to the other by fixing means 37, such as, for example, screws passing through a tapping in a first half ring and continuing in a tapping of a second half ring.

So as to prevent any movement of rotation of the two rings with respect to the drilling element, two projections respectively 40, 41; 42, 43 are provided on each of the half rings, with orifices for passing therethrough the means for fixing to the drilling element. When the two rings are mounted, these projections are situated in a plane of a diametrical cross section of the drilling element.

FIG. 2 shows a sectional view of the fixing of projection 43 to a drilling element 50. Ring 35 abuts laterally against a stress reinforcement 51 giving the tube a larger diameter than in the sensitive zone where the stress measurements are made by the sensor.

So as to leave a clearance between the rings and the drilling element, the inner diameter of the rings is greater than the outer diameter of the drilling tube. On the other hand, in order to provide correct fixing of the rings, a spacer 60 is placed between projection 43 and tube 50.

Each of the projections 40, 41, 42, 43 comprises a flexible blade 55, 56, 57, 58 forming an articulation for the rings with respect to the drilling element when said element is subjected to a flexion force in a plane containing said projections.

Each extensometric sensor is fixed to the rings (FIG. 1) by the engagement of fixing lugs 26, 18, 26', 18', each in a recess, respectively 43, 44, 45, 46 formed in the thickness of said ring.

Each ring comprises two recesses disposed in a direction perpendicular to the direction passing through the two projections fixing said ring to the drilling tube.

The two recesses and the two projections are placed respectively in symmetry with respect to the longitudinal axis of the tube.

These passageways 46 receive locking screws 70, shown in FIG. 3, which hold the extensometric sensor in position against any longitudinal movement.

At rest, the zero stress measurement must be the same in each extensometric sensor. Now, even if machining precautions are taken, it is indispensable for a device to be provided at the level at which the extensometers are fixed to one of the rings for taking up machining errors.

This take-up of errors is obtained by using, on one of the two rings, two recesses 48, 49 at the side of the central recess 46 receiving the fixing lug. These lateral recesses receives wedges 71 whose profile widens out and which bear against the walls of the ring under the action of pusher screws 72.

Thus, this pusher screw and wedge device makes it possible to place a slight prestress in each extensometer, so as to avoid hysteresis phenomena.

With the system subjected to high vibrations, precautions must be taken so as to prevent the system from being destroyed. On the one hand, the extensometers and the rings are made as light as possible without adversely affecting their rigidity and, on the other hand, shoes, which may be in particular made from rubber, are inserted between the tube and the extensometers for damping the vibrations.

Finally, between the rings and the drilling tube, a flexible polymer is injected for damping the movement of the rings.

In order to increase the sensitivity of the measurements, two extensometric sensors are placed symmetrically. However, the same advantages could be obtained by associating a solid bar with an extensometric sensor, so that the bar compensates identically the forces to which the sensor is subjected.

The effects of differential expansion between the central tube and the extensometers may be feared during temperature changes. To eliminate them, the extensometers and the tube must be machined from the same metal ingot. Thus, the same expansion coefficients are to be found in the extensometers and in the central tube.

Finally, as readily apparent the articulations described above in the form of flexible blades may be replaced particularly by ball thrust bearings, knife articulations, . . .

Naturally, the invention is not limited by the features which have been described specifically or by the details of the particular embodiment chosen for illustrating the invention. All kinds of variants may be made to the particular embodiment which has been described by way of example and its component elements without departing from the scope of the invention. The latter thus covers all the means forming technical equivalents, the means described as well as combinations thereof.

What is claimed is:

1. An extensometric sensor for measuring stresses acting on a drilling element at the bottom of a well by gauges, the sensor comprising:
    a first measurement zone formed from at least two traction blades having measurement gauges mounted thereon, said two traction blades being connected at respective ends thereof by uprights so as to form a first deformable parallelogram, said traction blades being oriented in a first direction;
    a second measurement zone formed of at least two torsion blades having measurement gauges mounted thereon, said two torsion blades being connected at respective ends thereof by cross-pieces so as to form a second deformable parallelogram, said torsion blades being oriented in a second direction perpendicular to the first direction;
    means for connecting said first zone and said second zone together; and
    means for mounting the extensometric sensor on said drilling element, and
    wherein said cross-pieces and said uprights have a larger cross-sectional dimension with respect to said torsion blades and said traction blades.

2. The extensometric stress measurement sensor as claimed in claim 1, wherein said means for connecting comprises an articulation disposed centrally with respect to a longitudinal axis passing through said first and second zones, said articulation providing for flexion of the sensor along said longitudinal axis without any action of deformation on the first and second zones.

3. The extensometric stress measurement sensor as claimed in claim 2, wherein said uprights of the first zone each comprise at one end thereof a right-angled extension, wherein an extension of a first upright is connected to the flexion articulation, and wherein said means for mounting includes a lug provided on an extension of the second upright for mounting the sensor to said drilling element.

4. The extensometric stress measurement sensor as claimed in claim 3, wherein a first cross-piece of said second zone is connected to the flexion articulation, and wherein said means for mounting includes a lug provided on a second cross-piece for mounting the sensor to the drilling element.

5. The extensometric stress measurement sensor as claimed in claim 4, wherein extensions of said uprights and extensions of said cross pieces are disposed in parallel directions and perpendicular to the direction of the flexion articulation.

6. The extensometric stress measurement sensor as claimed in claim 5, wherein each of said first and second measurement zones comprises three blades, two of said three blades form opposite faces of the deformable parallelogram and the third blade is disposed between the first two blades and supports the stress measurement gauges.

7. The extensometric stress measurement sensor as claimed in claim 6, wherein a ratio between a length of the blades and a total length of the sensor is between 1/10 and 2/10, and wherein a ratio between a thickness of said blades and a thickness of the uprights or of the cross-pieces is between 1/20 and 1/10.

8. The extensometric stress measurement sensor as claimed in one of claims 1 or 2, mounted on a drilling element at the bottom of a well, wherein said means for mounting includes support means for supporting said sensor so that an axis of said sensor is disposed substantially in a longitudinal direction of said drilling element.

9. The extensometric stress measurement sensor as claimed in claim 8, wherein said support means comprise two support rings disposed about the drilling element and each respectively supporting an end of the sensor through a fixing lug and a member disposed symmetrically to said sensor with respect to the axis of the drilling element.

10. The extensometric stress measurement sensor as claimed in claim 9, wherein said member disposed symmetrically to the sensor is formed by a second extensometric sensor.

11. The extensometric stress measurement sensor as claimed in claim 10, wherein each of the support rings comprises two projections diametrically oppositely disposed with respect to the axis of the drilling element and disposed in a direction perpendicular to the direction of the fixing lug said projections forming points for mounting said rings on said drilling element by securing means.

12. The extensometric stress measurement sensor as claimed in claim 11, wherein said projections each comprise a flexible blade forming an articulation for the support rings with respect to the drilling element when said drilling element is subjected to a flexion force in a plane containing said projections.

13. The extensometric stress measurement sensor as claimed in claim 12, wherein said support rings comprise recesses for engagingly receiving the fixing lugs, and wherein said fixing lugs are held in position in said recesses by locking screws 14. The extensometric stress measurement sensor as claimed in claim 13, wherein said support rings further comprise lateral recesses, situated symmetrically with respect to the recess receiving the fixing lug, in which are engaged wedges which are movable by pusher screws so as to prestress the sensors.

15. The extensometric stress measurement sensor as claimed in claim 14, wherein damping shoes are placed between the sensors and the drilling element for damping vibrations.

16. The extensometric stress measurement sensor as claimed in claim 2, wherein a first cross-piece of said second zone is connected to the flexion articulation and a second cross-piece is provided with a lug for fixing to said drilling element.

17. A method for measuring a tension and twisting moment applied to a drilling element the method comprising the steps of:
    providing an extensometric sensor including a first measuring zone and a second measuring zone, said first measuring zone including a central traction blade and an additional traction blade on opposite sides of said central traction blade, said traction blades being connected to form a first deformable parallelogram, said second measuring zone including a central torsion blade and an additional torsion blade disposed on respective sides of said central torsion blade, said torsion blades being connected to form a second deformable parallelogram;
    mounting said extensometric sensor on the drilling element so that an axis of the extensometric sensor is disposed substantially in a longitudinal direction of said drilling element;
    placing stress gauges on the central traction blade and the central torsion blade;

measuring generated deformations by said stress gauges in said first measuring zone and said second measuring zone;

providing an output signal from each of the stress gauges of measured deformations in said first measuring zone and said second measuring zone; and calculating stresses applied to the drilling element by summing the output signals from the stress gauges in the first measuring zone so as to obtain a value of the tension and summing the output signals from the stress gauges in the second measuring zone so as to obtain a value of the twisting moment.

* * * * *